United States Patent
Shuang et al.

(10) Patent No.: US 12,024,446 B2
(45) Date of Patent: Jul. 2, 2024

(54) MAGNETIZED POWDER STRENGTHENED METHOD FOR REMOVING NITRATE NITROGEN AND INORGANIC PHOSPHORUS

(71) Applicants: NANJING UNIVERSITY, Nanjing (CN); NANJING UNIVERSITY & YANCHENG ACADEMY OF ENVIRONMENTAL PROTECTION TECHNOLOGY AND ENGINEERING, Yancheng (CN)

(72) Inventors: Chendong Shuang, Nanjing (CN); Shuangshuang Li, Nanjing (CN); Tong Li, Nanjing (CN); Guang Zhang, Nanjing (CN); Aimin Li, Nanjing (CN); Ke Wang, Nanjing (CN); Juntian Wang, Nanjing (CN)

(73) Assignees: NANJING UNIVERSITY, Nanjing (CN); NANJING UNIVERSITY & YANCHENG ACADEMY OF ENVIRONMENTAL PROTECTION TECHNOLOGY AND ENGINEERING, Yancheng (CN)

( * ) Notice: Subject to any disclaimer, the term of this patent is extended or adjusted under 35 U.S.C. 154(b) by 403 days.

(21) Appl. No.: 17/599,919

(22) PCT Filed: Apr. 1, 2020

(86) PCT No.: PCT/CN2020/082655
§ 371 (c)(1),
(2) Date: Sep. 29, 2021

(87) PCT Pub. No.: WO2020/200215
PCT Pub. Date: Oct. 8, 2020

(65) Prior Publication Data
US 2022/0194824 A1 Jun. 23, 2022

(30) Foreign Application Priority Data
Apr. 3, 2019 (CN) .......... 201910264781.8

(51) Int. Cl.
*C02F 1/48* (2023.01)
*C02F 1/70* (2023.01)
(Continued)

(52) U.S. Cl.
CPC ............. *C02F 1/48* (2013.01); *C02F 1/705* (2013.01); *C02F 2101/105* (2013.01); *C02F 2101/163* (2013.01)

(58) Field of Classification Search
CPC .. C02F 1/705; C02F 1/48; C02F 1/488; C02F 2101/105; C02F 2101/16; C02F 2101/163
(Continued)

(56) References Cited

U.S. PATENT DOCUMENTS

| | | | | |
|---|---|---|---|---|
| 2001/0030160 | A1* | 10/2001 | Wechsler | C02F 1/52 210/695 |
| 2015/0191374 | A1 | 7/2015 | Schwarz et al. | |
| 2016/0052808 | A1* | 2/2016 | Huang | C02F 1/705 252/178 |

FOREIGN PATENT DOCUMENTS

| CN | 102884010 A | 1/2013 |
|---|---|---|
| CN | 103570114 A | 2/2014 |

(Continued)

OTHER PUBLICATIONS

Li et al., "Premagnetization for Enhancing the Reactivity of Multiple Zerovalent Iron Samples toward Various Contaminants", Environmental Science & Technology, Nov. 17, 2015, pp. 14401-14408.

*Primary Examiner* — Claire A Norris

(57) ABSTRACT

The present invention belongs to the technical field of water treatment, and in particular to a magnetic powder strengthened method for removing nitrate nitrogen and inorganic phosphorus, which includes the following steps: (1) mixing permanent magnetic material powder with paramagnetic Fe3O4 powder, and magnetizing the mixture in a magnetic field to prepare magnetic powder; (2) adding the magnetic powder directly or in a form of granular filler into a water treatment reaction vessel; and (3) allowing the to-be-treated water to enter the water treatment reaction vessel, perform- (Continued)

ing a chemical reaction of removing nitrate nitrogen and inorganic phosphorus in the presence of a reducing agent, and discharging the water after the reaction is completed. By adopting the method of the present invention, a uniform and fine magnetic field can be provided, thus the reaction efficiency is improved, and the process is simplified and the cost is lowered.

20 Claims, 1 Drawing Sheet

(51) Int. Cl.
*C02F 101/10* (2006.01)
*C02F 101/16* (2006.01)

(58) Field of Classification Search
USPC .................................................. 210/695, 757
See application file for complete search history.

(56) References Cited

FOREIGN PATENT DOCUMENTS

| | | | |
|---|---|---|---|
| CN | 103626293 A | 3/2014 | |
| CN | 104876306 A | 9/2015 | |
| CN | 107697987 A | 2/2018 | |
| CN | 109851144 A | 6/2019 | |

\* cited by examiner

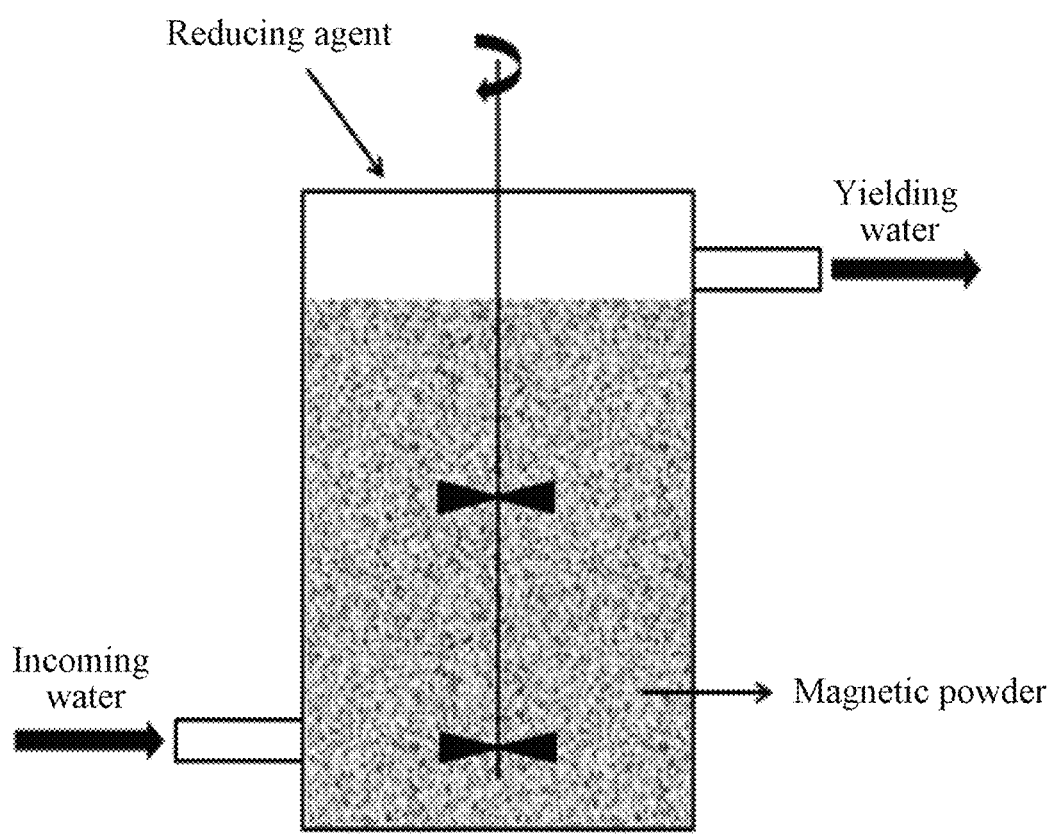

MAGNETIZED POWDER STRENGTHENED METHOD FOR REMOVING NITRATE NITROGEN AND INORGANIC PHOSPHORUS

TECHNICAL FIELD

The present invention belongs to the technical field of water treatment, and in particular to a magnetic powder strengthened method for removing nitrate nitrogen and inorganic phosphorus.

BACKGROUND

With the increasing population and accelerating processes of industrialization and urbanization, nitrogen in the natural water body has a trend toward a high level of nitration and can be transformed into substances such as nitrosamine in the water body, which threatens the ecological environment, animals and plants and human life and health. Therefore, World Health Organization, multiple countries and regions set pollution restriction indexes for nitrogen. As shown in reports or disclosures, nitrate nitrogen in the surface water, underground water, drinking water and wastewater around the world exceeds the standard quite seriously.

As for wastewater treatment, denitrification is the most common method for removing nitrate, which has a shortcoming that denitrifying bacteria need certain temperature and a biodegradable carbon source. Therefore, it is hard to popularize and apply denitrification in a large scale in a region with a relatively low temperature or for wastewater lacking a carbon source because raising the temperature or supplementing the carbon source will significantly increase the cost. Furthermore, the method is not applicable to the surface water, underground water or drinking water. Conventional physical and chemical methods mainly include reverse osmosis, ion exchange, reduction and the like, and each technique has respective advantages and shortcomings. Both the reverse osmosis and ion exchange are a separation method and do not eliminate nitrate fundamentally, but only separate pollutants through physical and chemical actions. Without further treatment, the pollutants are not yet disposed from a perspective of natural environment. Reduction with zero-valent iron and ferrous iron is an economical and efficient removal method which is widely studied and attracts much attention because of easiness in operation, a small floor area and a high reduction efficiency. Zero-valent iron, ferrous iron, green rust, $Fe_3O_4$ and the like all can be used as a reducing agent for nitrate nitrogen. However, it is quite difficult to control the reaction efficiency and reaction products of these reducing agents. In most actual cases, the reduction products are primarily ammonia nitrogen.

In the method for reduction treatment of nitrate in water disclosed by the patent (application No. 201310505699.2), reduction treatment is performed on nitrate by using the reducibility of green rust and the effects of catalyst ions, thus the nitrate is remarkably removed. But there still exists room for improvement in the removal of total nitrogen, and the removal of total phosphorus is not involved. The document (Environ. Sci. Technol., 2015, 49(24), 14401-14408) mentions that a magnetic field can generate convection in a solution to enhance transmission of substances, and can stimulate paramagnetic ions to migrate to increase the reaction rate. The method for treating sewage with a magnetic field disclosed by the patent (application No. 201510237845.7) presents that a magnetic field can effectively increase the removal rate of pollutants. However, since a general magnetic source acts in a small range and a small distance, it is hard to use the method in a large-scale reaction system in actual projects as the cost is added.

SUMMARY

An objective of the present invention is to solve a problem that a magnetic field is hard to be evenly distributed in large-scale water treatment through the dispersion of hard magnetic powder based on the prior art, and to provide a magnetic field strengthened method for removing nitrate nitrogen and inorganic phosphorus, to realize efficient removal of nitrate nitrogen and total nitrogen, at the same time, remove inorganic phosphorus, simplify the process and lower the cost.

The technical solution of the present invention is as follows:

A magnetic powder strengthened method for removing nitrate nitrogen and inorganic phosphorus, comprising the following steps:
(1) mixing a permanent magnetic material powder with a paramagnetic $Fe_3O_4$ powder, and magnetizing the mixture in a magnetic field to prepare a magnetic powder;
(2) adding the magnetic powder directly or in a form of granular filler into a water treatment reaction vessel; and
(3) allowing the to-be-treated water to enter the water treatment reaction vessel, performing a chemical reaction of removing nitrate nitrogen and inorganic phosphorus in the presence of a reducing agent, and discharging the water after the reaction is completed.

The present invention provides a water treatment method, in which a magnetic field is provided by a permanent magnetic material, a reducing agent is promoted to perform catalytic reduction on nitrate nitrogen to remove total nitrogen, and the product can be further combined with inorganic phosphorus (phosphate radical) for coagulating sedimentation to remove inorganic phosphorus. The removal rate of nitrate nitrogen by catalytic reduction and the degradation efficiency of total nitrogen in the to-be-treated water basically exceed 80%, and the removal rate of inorganic phosphorus in the to-be-treated water basically exceeds 90%. In some preferred solutions, the removal rate of nitrate nitrogen by catalytic reduction and the degradation efficiency of total nitrogen go beyond 90%.

In the method for removing nitrate nitrogen and inorganic phosphorus in water provided by the invention, in the step (1), the permanent magnetic material powder needs to be mixed with paramagnetic $Fe_3O_4$ so that a uniform and fine magnetic field can be provided near a catalytic reaction site after the permanent magnetic material powder is later added into the water treatment reaction vessel. The water treatment reaction vessel mentioned in the present invention may be a reactor or a reaction tank for water treatment.

In a solution, the concentration of the nitrate nitrogen in the to-be-treated water mentioned in the present invention is 40-500 mg/L. With the cooperation of other conditions, in a preferred solution, the concentration of the nitrate nitrogen in the to-be-treated water is 80-300 mg/L, and more preferably 200-250 mg/L.

In a preferred solution, in the step (3), before or after the to-be-treated water enters the water treatment reaction vessel, the reducing agent is added in batches or continuously. The to-be-treated water continuously enters the water treatment reaction vessel, in from one end and out from the other end, and a chemical reaction takes place in the flowing process. Or the to-be-treated water enters the water treatment reaction vessel and stays for a period of time to allow a chemical reaction to take place, and the water is discharged after the reaction is completed.

In a solution, the permanent magnetic material powder is one or more of a rare-earth permanent magnetic material, a metal permanent magnetic material or a ferrite permanent magnetic material. For example, without influencing the effect of the present invention, the rare-earth permanent magnetic material may be one or more of Sm—Co based, Nd—Fe—B, La—Ce or Re—Fe—B. The metal permanent magnetic material may be Al—Ni—Co, Fe—Cr—Co or a combination thereof. The ferrite permanent magnetic material may be one or more of $\alpha$-$Fe_2O_3$, $BaFe_{12}O_{19}$ or $SrFe_{12}O_{19}$.

In a more preferred solution, in the step (1), a mass ratio of the permanent magnetic material powder to the paramagnetic $Fe_3O_4$ powder is 1:0.01-1:150. For example, without influencing the effect of the present invention, the mass ratio may be preferably 1:5-1:100, and in particular preferably 1:10-1:40.

In a preferred solution, an amount-of-substance ratio of the magnetic powder added in the step (2) to the nitrate nitrogen in the to-be-treated water in the step (3) is 1:0.01-1:100. Without influencing the effect of the present invention, the amount-of-substance ratio may be preferably 1:10-1:100, and more preferably 1:30-1:80.

In the present invention, the reducing agent added in the step (3) is a reducing substance, such as one or more of elemental zero-valent iron, elemental zero-valent aluminum, elemental zero-valent zinc, elemental zero-valent manganese, elemental zero-valent magnesium, a ferrous compound, a cuprous compound, green rust or $Fe_3O_4$, which can react with nitrate nitrogen and generates an oxidation product having a coagulation effect.

The ferrous compound mentioned in the present invention may be but not limit to ferrous chloride, ferrous sulfate and ferrous hydroxide.

The cuprous compound mentioned in the present invention may be but not limit to cuprous chloride, cuprous sulfate and cuprous hydroxide.

The green rust (GR) mentioned in the present invention may be but not limit to one or more of $GR(SO_4^{2-})$, $GR(CO_3^{2-})$, $GR(Cl^-)$ or $GR(SO_3^{2-})$.

Further, in the step (3), the ratio of the dosage of the reducing agent to the amount of substance of the nitrate nitrogen in the to-be-treated water is 1:0.01-1:150; and without influencing the effect of the present invention, the ratio may be preferably 1:0.8-1:80, and more preferably 1:10-1:50.

In a preferred solution, a sludge discharge system may be disposed at the bottom of the water treatment reaction vessel mentioned in the step (2) of the present invention, to regularly clear the iron sludge generated by the removal of inorganic phosphorous.

In the step (3) of the present invention, the to-be-treated water entering the water treatment reaction vessel does not contain sodium hypochlorite, chloramine, ozone, sodium persulfate or potassium permanganate. Or a strong oxidant in the to-be-treated water is treated in advance, otherwise, the strong oxidant will react with the reducing agent to influence a reaction between the reducing agent and the nitrate nitrogen.

In a preferred solution, in the step (3), the reducing agent is added in batches or continuously, to ensure reduction of the nitrate nitrogen.

When the reducing agent is added in batches as mentioned in the present invention, each batch takes 5 min-1000 min, preferably 30 min-500 min.

The flow rate of the to-be-treated water continuously entering the water treatment reaction vessel as mentioned in the step (3) of the present invention is 0.1 L/h-1000 L/h.

After entering the water treatment reaction vessel as mentioned in the present invention, the time of the to-be-treated water staying in the water treatment reaction vessel is 1-600 minutes, preferably 1-300 minutes, and more preferably 1-50 minutes.

Further, in the step (3), stirring is mechanical stirring or hydraulic stirring.

The technical solution of the present invention has the following advantages:

(1) The magnetized permanent magnetic material powder provides a magnetic field and a uniform and fine magnetic field in the water treatment reaction vessel, thereby improving the reaction efficiency and facilitating the removal of nitrate nitrogen by catalytic reduction and the degradation of total nitrogen.

(2) $Fe_3O_4$ powder can serve as a catalyst to increase selectivity in the removal of total nitrogen, and the mixing of the magnetic powder and the reducing agent can enhance the stability of the reducing system.

(3) In the reaction process, the dissolved iron ions generated after the reaction of the iron-based reducing agent can serve as a coagulant to further remove inorganic phosphorus in the to-be-treated water, to realize removal of nitrogen and phosphorus.

(4) The whole catalytic reduction reaction is finished in a reaction system, in which water goes in from one end of the system and out from the other end, and the floor area is small. Moreover, through regular water cutoff and addition of the reducing agent, the activity of the reducing system can be restored, thus the reaction system is recycled, and the cost is saved.

BRIEF DESCRIPTION OF THE DRAWINGS

FIG. 1 is a schematic diagram of the magnetic powder strengthened method for removing nitrate nitrogen and inorganic phosphorus of the present invention.

DETAILED DESCRIPTION

The magnetic powder strengthened method for removing nitrate nitrogen and inorganic phosphorus of the present invention is further described with the following embodiments and in conjunction with drawings, but these embodiments do not constitute any limitation on the present invention.

As shown in FIG. 1, the water treatment reaction vessel mentioned in the present invention is a reactor or a reaction tank with a stirring device, with water going in from one end and out from the other end so as to easily introduce the to-be-treated water and discharge the water after a chemical reaction in a timely manner as necessary. The embodiments below all adopt the above-mentioned reactor or reaction tank.

Embodiment 1

A magnetic powder strengthened method for removing nitrate nitrogen and inorganic phosphorus, including the following steps:

(1) Sm—Co based rare-earth permanent magnetic powder was mixed with paramagnetic $Fe_3O_4$ powder in a mass ratio of 1:0.01 to form a powder mixture, and the powder mixture was magnetized in a magnetic field to prepare magnetic powder;

(2) the above-mentioned magnetic powder was directly added into the reactor, in which an amount-of-substance ratio of the magnetic powder to the nitrate nitrogen in the to-be-treated water was 1:0.01; and (3) before the to-be-treated water entered the above-mentioned reactor, a reducing agent, elemental zero-valent iron, was continuously added, and mechanical stirring was started at the same time, in which a ratio of the dosage of the reducing agent to the amount of substance of the nitrate nitrogen in the to-be-treated water was 1:0.1, and the to-be-treated water continuously entered the reactor at a flow rate of 0.1 L/h and was discharged from the other end while reacting in the flowing process.

After the operation of the device, the concentration of the nitrate nitrogen in the to-be-treated water was 40 mg/L, and 14 mg/L in the yielding water, while the concentration of the total phosphorus in the to-be-treated water was 3 mg/L, and 0.4 mg/L in the yielding water.

Embodiment 2

A magnetic powder strengthened method for removing nitrate nitrogen and inorganic phosphorus, including the following steps:

(1) Nd—Fe—B rare-earth permanent magnetic powder was mixed with paramagnetic $Fe_3O_4$ powder in a mass ratio of 1:0.1 to form a powder mixture, and the mixture was magnetized in a magnetic field to prepare magnetic powder;

(2) the above-mentioned magnetic powder was directly added into the reactor, in which an amount-of-substance ratio of the magnetic powder to the nitrate nitrogen in the to-be-treated water was 1:0.1; and (3) after the to-be-treated water entered the above-mentioned reactor, a reducing agent, elemental zero-valent aluminum, was added in batches, 5 min for each batch, and hydraulic stirring was started at the same time, in which a ratio of the dosage of the reducing agent to the amount of substance of the nitrate nitrogen in the to-be-treated water was 1:1, and the to-be-treated water continuously entered the reactor at a flow rate of 5 L/h and was discharged from the other end while reacting in the flowing process.

After the operation of the device, the concentration of the nitrate nitrogen in the to-be-treated water was 80 mg/L, and 12 mg/L in the yielding water, while the concentration of total phosphorus in the to-be-treated water was 3 mg/L, and 0.2 mg/L in the yielding water.

Embodiment 3

A magnetic powder strengthened method for removing nitrate nitrogen and inorganic phosphorus, including the following steps:
treatment was carried out with the following steps:

(1) La—Ce rare-earth permanent magnetic powder was mixed with paramagnetic $Fe_3O_4$ powder in a mass ratio of 1:1 to form a powder mixture, and the mixture was magnetized in a magnetic field to prepare magnetic powder;

(2) the above-mentioned magnetic powder was prepared into granular filler and added into the reactor, in which an amount-of-substance ratio of the magnetic powder to the nitrate nitrogen in the to-be-treated water was 1:1; and (3) before the to-be-treated water entered the above-mentioned reactor, a reducing agent, elemental zero-valent zinc, was continuously added, and hydraulic stirring was started at the same time, in which a ratio of the dosage of the reducing agent to the amount of substance of the nitrate nitrogen in the to-be-treated water was 1:3, and the to-be-treated water continuously entered the reactor at a flow rate of 100 L/h and was discharged from the other end while reacting in the flowing process.

After the operation of the device, the concentration of the nitrate nitrogen in the to-be-treated water was 50 mg/L, and 4 mg/L in the yielding water, while the concentration of the total phosphorus in the to-be-treated water was 5 mg/L, and 0.1 mg/L in the yielding water.

Embodiment 4

A magnetic powder strengthened method for removing nitrate nitrogen and inorganic phosphorus, including the following steps:
treatment was carried out with the following steps:

(1) Re—Fe—B rare-earth permanent magnetic powder was mixed with paramagnetic $Fe_3O_4$ powder in a mass ratio of 1:5 to form a powder mixture, and the powder mixture was magnetized in a magnetic field to prepare magnetic powder;

(2) the above-mentioned magnetic powder was prepared into granular filler and added into the reaction tank, in which an amount-of-substance ratio of the magnetic powder to the nitrate nitrogen in the to-be-treated water was 1:10; and (3) before the to-be-treated water entered the above-mentioned reaction tank, reducing agents, elemental zero-valent manganese and elemental zero-valent magnesium, were continuously added (in an amount-of-substance ratio of 1:1), mechanical stirring was started at the same time, in which a ratio of the total dosage of the reducing agents to the amount of substance of the nitrate nitrogen in the to-be-treated water was 1:8, and the to-be-treated water continuously entered the reaction tank at a flow rate of 1000 L/h and was discharged from the other end while reacting in the flowing process.

After the operation of the device, the concentration of the nitrate nitrogen in the to-be-treated water was 100 mg/L, and 11 mg/L in the yielding water, while the concentration of the total phosphorus in the to-be-treated water was 8 mg/L, and 0.4 mg/L in the yielding water.

Embodiment 5

A magnetic powder strengthened method for removing nitrate nitrogen and inorganic phosphorus, including the following steps:
treatment was carried out with the following steps:

(1) Al—Ni—Co metal permanent magnetic powder was mixed with paramagnetic $Fe_3O_4$ powder in a mass ratio of 1:10 to form a powder mixture, and the powder mixture was magnetized in a magnetic field to prepare magnetic powder;

(2) the above-mentioned magnetic powder was directly added into the reaction tank, in which an amount-of-substance ratio of the magnetic powder to the nitrate nitrogen in the to-be-treated water was 1:30; and (3) after the to-be-treated water entered the above-mentioned reaction tank, reducing agents, elemental iron and elemental aluminum, were added (in an amount-of-substance ratio of 1:100) in batches, 100 min for each batch, and mechanical stirring was started at the same time, in which a ratio of the dosage of the reducing agents to the amount of substance of the nitrate nitrogen in the to-be-treated water was 1:10, and the to-be-treated water entered the reaction tank and stayed for a period of time (1 minute), for a chemical reaction, and was discharged after the reaction was completed.

After the operation of the device, the concentration of the nitrate nitrogen in the to-be-treated water was 60 mg/L, and 4 mg/L in the yielding water, while the concentration of the total phosphorus in the to-be-treated water was 9 mg/L, and 0.3 mg/L in the yielding water.

Embodiment 6

A magnetic powder strengthened method for removing nitrate nitrogen and inorganic phosphorus, including the following steps:

treatment was carried out with the following steps:
(1) Fe—Cr—Co metal permanent magnetic powder was mixed with paramagnetic $Fe_3O_4$ powder in a mass ratio of 1:20 to form a powder mixture, and the powder mixture was magnetized in a magnetic field to prepare magnetic powder;

(2) the above-mentioned magnetic powder was directly added into the reactor, in which an amount-of-substance ratio of the magnetic powder to the nitrate nitrogen in the to-be-treated water was 1:50; and (3) after the to-be-treated water entered the above-mentioned reactor, a reducing agent, ferrous chloride, was added in batches, 500 min for each batch, and hydraulic stirring was started at the same time, in which a ratio of the total dosage of the reducing agent to the amount of substance of the nitrate nitrogen in the to-be-treated water was 1:30, and the to-be-treated water entered the reactor and stays for a period of time (30 minutes), for a chemical reaction, and was discharged after the reaction was completed.

After the operation of the device, the concentration of the nitrate nitrogen in the to-be-treated water was 200 mg/L, and 13 mg/L in the yielding water, while the concentration of the total phosphorus in the to-be-treated water was 15 mg/L, and 0.2 mg/L in the yielding water.

Embodiment 7

A magnetic powder strengthened method for removing nitrate nitrogen and inorganic phosphorus, including the following steps:

treatment was carried out with the following steps:
(1) $\alpha$-$Fe_2O_3$ ferrite permanent magnetic powder was mixed with paramagnetic $Fe_3O_4$ powder in a mass ratio of 1:40 to form a powder mixture, and the powder mixture was magnetized in a magnetic field to prepare magnetic powder;

(2) the above-mentioned magnetic powder was prepared into granular filler and added into the reactor, in which an amount-of-substance ratio of the magnetic powder to the nitrate nitrogen in the to-be-treated water was 1:80; and (3) before the to-be-treated water entered the above-mentioned reactor, a reducing agent GR ($Cl^-$) was continuously added, and hydraulic stirring was started at the same time, in which a ratio of the total dosage of the reducing agent to the amount of substance of the nitrate nitrogen in the to-be-treated water was 1:50, and the to-be-treated water entered the reactor and stayed for a period of time (50 minutes), for a chemical reaction, and was discharged after the reaction was completed.

After the operation of the device, the concentration of the nitrate nitrogen in the to-be-treated water was 80 mg/L, and 7 mg/L in the yielding water, while the concentration of the total phosphorus in the to-be-treated water was 20 mg/L, and 0.4 mg/L in the yielding water.

Embodiment 8

A magnetic powder strengthened method for removing nitrate nitrogen and inorganic phosphorus, including the following steps:

treatment was carried out with the following steps:
(1) $BaFe_{12}O_{19}$ ferrite permanent magnetic powder was mixed with paramagnetic $Fe_3O_4$ powder in a mass ratio of 1:100 to form a powder mixture, and the powder mixture was magnetized in a magnetic field to prepare magnetic powder;

(2) the above-mentioned magnetic powder was directly added into the reaction tank, in which an amount-of-substance ratio of the magnetic powder to the nitrate nitrogen in the to-be-treated water was 1:100; and (3) after the to-be-treated water entered the above-mentioned reaction tank, $Fe_3O_4$ was added in batches, 1000 min for each batch, and hydraulic stirring was started at the same time, in which a ratio of the total dosage of the reducing agent to the amount of substance of the nitrate nitrogen in the to-be-treated water was 1:80, and the to-be-treated water entered the reaction tank and stayed for a period of time (300 minutes), for a chemical reaction, and was discharged after the reaction was completed.

After the operation of the device, the concentration of the nitrate nitrogen in the to-be-treated water was 120 mg/L, and 13 mg/L in the yielding water, while the concentration of the total phosphorus in the to-be-treated water was 8 mg/L, and 0.2 mg/L in the yielding water.

Embodiment 9

A magnetic powder strengthened method for removing nitrate nitrogen and inorganic phosphorus, including the following steps:

treatment was carried out with the following steps:
(1) $SrFe_{12}O_{19}$ ferrite permanent magnetic powder was mixed with paramagnetic $Fe_3O_4$ powder in a mass ratio of 1:100 to form a powder mixture, and the powder mixture was magnetized in a magnetic field to prepare magnetic powder;

(2) the above-mentioned magnetic powder was directly added into the reactor, in which an amount-of-substance ratio of the magnetic powder to the nitrate nitrogen in the to-be-treated water was 1:100; and (3) before the to-be-treated water entered the above-mentioned reactor, reducing agents, GR ($SO_4^{2-}$) and $Fe_3O_4$, were continuously added (in an amount-of-substance ratio of 5:1), and hydraulic stirring was started at the same time, in which a ratio of the total dosage of the reducing agent to the amount of substance of the nitrate nitrogen in the to-be-treated water was 1:100, and the to-be-treated water enters the reactor and stayed for a period of time (600 minutes), for a chemical reaction, and was discharged after the reaction was completed.

After the operation of the device, the concentration of the nitrate nitrogen in the to-be-treated water was 250 mg/L, and 14 mg/L in the yielding water, while the concentration of the total phosphorus in the to-be-treated water was 10 mg/L, and 0.2 mg/L in the yielding water.

What is claimed is:

1. A magnetic powder strengthened method for removing nitrate nitrogen and inorganic phosphorus, comprising the following steps:
   (1) mixing a permanent magnetic material powder with a paramagnetic $Fe_3O_4$ powder, and magnetizing the mixture in a magnetic field to prepare a magnetic powder;
   (2) adding the magnetic powder directly or in a form of granular filler into a water treatment reaction vessel; and
   (3) allowing to-be-treated water to enter the water treatment reaction vessel, performing a chemical reaction of removing nitrate nitrogen and inorganic phosphorus in the presence of a reducing agent, and discharging yielding water after the chemical reaction is completed.

2. The magnetic powder strengthened method for removing nitrate nitrogen and inorganic phosphorus according to claim 1, wherein in the step (1), the permanent magnetic material powder is one or more of a rare-earth permanent magnetic material, a metal permanent magnetic material or a ferrite permanent magnetic material; and a mass ratio of the permanent magnetic material powder to the paramagnetic $Fe_3O_4$ powder is 1:0.01-1:150.

3. The magnetic powder strengthened method for removing nitrate nitrogen and inorganic phosphorus according to claim 2, wherein in the step (1), the rare-earth permanent magnetic material is one or more of Sm—Co based, Nd—Fe—B, La—Ce or Re—Fe—B; the metal permanent magnetic material is Al—Ni—Co, Fe—Cr—Co or a combination thereof; and the ferrite permanent magnetic material is one or more of $\alpha$-$Fe_2O_3$, $BaFe_{12}O_{19}$ or $SrFe_{12}O_{19}$.

4. The magnetic powder strengthened method for removing nitrate nitrogen and inorganic phosphorus according to claim 1, wherein an amount-of-substance ratio of the magnetic powder added in the step (2) to the nitrate nitrogen in the to-be-treated water in the step (3) is 1:0.01-1:100.

5. The magnetic powder strengthened method for removing nitrate nitrogen and inorganic phosphorus according to claim 1, wherein in the step (3), the reducing agent is one or more of elemental zero-valent iron, elemental zero-valent aluminum, elemental zero-valent zinc, elemental zero-valent manganese, elemental zero-valent magnesium, a ferrous compound, a cuprous compound, green rust or $Fe_3O_4$.

6. The magnetic powder strengthened method for removing nitrate nitrogen and inorganic phosphorus according to claim 5, wherein in the step (3), an amount-of-substance ratio of the reducing agent to the nitrate nitrogen in the to-be-treated water is 1:0.1-1:150.

7. The magnetic powder strengthened method for removing nitrate nitrogen and inorganic phosphorus according to claim 1, wherein in the step (3), before or after the to-be-treated water enters the water treatment reaction vessel, the reducing agent is added in batches or continuously; the to-be-treated water continuously enters the water treatment reaction vessel, in from one end and out from the other end, and the chemical reaction takes place in a flowing process; or the to-be-treated water enters the water treatment reaction vessel and stays for a period of time to allow the chemical reaction to take place, and the yielding water is discharged after the chemical reaction is completed.

8. The magnetic powder strengthened method for removing nitrate nitrogen and inorganic phosphorus according to claim 1, wherein in the step (3), the to-be-treated water does not contain sodium hypochlorite, chloramine, ozone, sodium persulfate or potassium permanganate.

9. The magnetic powder strengthened method for removing nitrate nitrogen and inorganic phosphorus according to claim 7, wherein in the step (3), when the reducing agent is added in batches, each batch takes 5 min-1000 min; a flow rate of the to-be-treated water continuously entering the water treatment reaction vessel is 0.1 L/h-1000 L/h; and the time of the to-be-treated water staying in the water treatment reaction vessel is 1-600 minutes.

10. The magnetic powder strengthened method for removing nitrate nitrogen and inorganic phosphorus according to claim 1, wherein in the step (2), an iron sludge generated by the removal of inorganic phosphorous is regularly cleared.

11. The magnetic powder strengthened method for removing nitrate nitrogen and inorganic phosphorus according to claim 2, wherein in the step (1), the mass ratio of the permanent magnetic material powder to the paramagnetic $Fe_3O_4$ powder is 1:5-1:100.

12. The magnetic powder strengthened method for removing nitrate nitrogen and inorganic phosphorus according to claim 11, wherein in the step (1), the mass ratio of the permanent magnetic material powder to the paramagnetic $Fe_3O_4$ powder is 1:10-1:40.

13. The magnetic powder strengthened method for removing nitrate nitrogen and inorganic phosphorus according to claim 4, wherein the amount-of-substance ratio of the magnetic powder added in the step (2) to the nitrate nitrogen in the to-be-treated water in the step (3) is 1:10-1:100.

14. The magnetic powder strengthened method for removing nitrate nitrogen and inorganic phosphorus according to claim 13, wherein the amount-of-substance ratio of the magnetic powder added in the step (2) to the nitrate nitrogen in the to-be-treated water in the step (3) is 1:30-1:80.

15. The magnetic powder strengthened method for removing nitrate nitrogen and inorganic phosphorus according to claim 5, wherein in the step (3), the ferrous compound is one or more of ferrous chloride, ferrous sulfate or ferrous hydroxide; and the cuprous compound is one or more of cuprous chloride, cuprous sulfate or cuprous hydroxide.

16. The magnetic powder strengthened method for removing nitrate nitrogen and inorganic phosphorus according to claim 6, wherein in the step (3), the amount-of-substance ratio of the reducing agent to the nitrate nitrogen in the to-be-treated water is 1:0.8-1:80.

17. The magnetic powder strengthened method for removing nitrate nitrogen and inorganic phosphorus according to claim 16, wherein in the step (3), the amount-of-substance ratio of the reducing agent to the nitrate nitrogen in the to-be-treated water is 1:10-1:50.

18. The magnetic powder strengthened method for removing nitrate nitrogen and inorganic phosphorus according to claim 9, wherein in the step (3), when the reducing agent is added in batches, each batch takes 30 min-500 min;

and the time of the to-be-treated water staying in the water treatment reaction vessel is 1-300 minutes.

19. The magnetic powder strengthened method for removing nitrate nitrogen and inorganic phosphorus according to claim 18, wherein in the step (3), the time of the to-be-treated water staying in the water treatment reaction vessel is 1-50 minutes.

20. The magnetic powder strengthened method for removing nitrate nitrogen and inorganic phosphorus according to claim 1, wherein the magnetic powder is a magnetic material, and an amount-of-substance ratio of the magnetic material added in the step (2) to the nitrate nitrogen in the to-be-treated water in the step (3) is 1:0.01-1:100.

* * * * *